United States Patent [19]

Migliori

[11] 4,427,897

[45] Jan. 24, 1984

[54] FIXED PITCH WIND TURBINE SYSTEM UTILIZING AERODYNAMIC STALL

[75] Inventor: Albert Migliori, Santa Fe, N. Mex.

[73] Assignees: John Midyette, III, Santa Fe; John Humphrey, Tesuque, both of N. Mex.

[21] Appl. No.: 339,836

[22] Filed: Jan. 18, 1982

[51] Int. Cl.³ .............................................. F03D 7/02
[52] U.S. Cl. ...................................... 290/44; 290/55
[58] Field of Search ................... 290/44, 55; 322/28, 322/35

[56] References Cited

U.S. PATENT DOCUMENTS

| | | | |
|---|---|---|---|
| 4,146,264 | 3/1979 | Korzeniewski | 290/44 |
| 4,171,491 | 10/1979 | Theyse | 290/44 X |
| 4,205,235 | 5/1980 | Pal et al. | 290/44 |
| 4,213,057 | 7/1980 | Are | 290/44 |
| 4,228,362 | 10/1980 | Jacobs et al. | 290/44 |
| 4,274,010 | 6/1981 | Lawson-Tancred | 290/44 X |
| 4,366,387 | 12/1982 | Carter, Jr. et al. | 290/44 X |

*Primary Examiner*—J. V. Truhe
*Assistant Examiner*—W. E. Duncanson, Jr.
*Attorney, Agent, or Firm*—William W. Cochran, II

[57] ABSTRACT

A fixed-pitch wind turbine system utilizing a permanent magnet alternator. Optimum output power is achieved by controlling the load on the stator output armature of the permanent magnet alternator. Energy is stored in the ac utility grid utilizing a synchronous inverter which couples energy from the alternator for storage in the ac utility grid in a controlled manner to regulate the rotational speed of the wind turbine and thereby extract a substantially optimum amount of output power from the wind turbine.

16 Claims, 19 Drawing Figures

FIXED PITCH WIND TURBINE SYSTEM UTILIZING AERODYNAMIC STALL

BACKGROUND OF THE INVENTION

The present invention pertains generally to wind turbine systems and more particularly to high-tip-speed-ratio wind turbine systems for producing electrical power economically. An important factor in designing a wind turbine system for generating electrical power is the economy of such a system. This includes not only efficiency of operation of the device but also capital costs of producing the system and the reliability and safety factors which accompany operation. Reduction of mechanical complexity in wind turbine systems reduces overall cost and provides greater reliability during operation.

Generally, two types of wind turbines have been used in the past to harness wind energy for various purposes. The two types of wind turbines include the fixed-pitch wind turbine and the variable-pitch or variable-geometry wind turbine.

The variable-pitch or variable-geometry wind turbine has been used in the prior art both to control rotational speed of the wind turbine and to increase the amount of energy extracted from the wind. Control of rotational speed using variable-pitch wind turbines has been used in some prior art devices to provide a constant rotational speed for a wide range of actual wind speeds which allows an alternator coupled to the wind turbine to provide a fixed output frequency and voltage. Not only do such devices fail to extract an optimum amount of energy from the wind, the variable-pitch, variable-geometry wind turbine is expensive, requires complex mechanical devices for proper operation, and failure of the complex mechanical controls can cause high-rotational-speed-induced failure in high winds which can cause extensive damage to equipment and possible injury to individuals. Thus, for optimum reliability, simplicity, and cost, it is desirable to use a fixed-pitch or fixed-geometry wind turbine if such a device can be made to operate in an efficient manner.

Of the fixed-pitch type wind turbines, there are two types of wind turbines, the multivane wheel and the high-tip-speed-ratio wind turbine. The multivane wheel turbine device, which has typically been used on farms to pump water, etc., has a relatively large number of blades having a large pitch angle relative to the plane of rotation. The multivane wheel turbine is therefore able to create a considerable amount of torque at relatively low rotational speeds, which is necessary for operating certain types of machinery.

In contrast, the high-tip-speed-ratio wind turbine has a small number of blades, usually 2-4 blades, which are shaped similar to a mirror image of airplane propeller blades. The pitch of the blade tips relative to the plane of rotation is much less than the pitch of the blades of the multivane wind turbine. Because of these differences, the high-tip-speed-ratio wind turbine operates at a considerably higher speed than the multivane wind turbine for a given wind velocity.

To provide maximum energy output from the wind turbine device, it is desirable to operate at maximum torque for the particular wind speed available. Maximum torque of the high-tip-speed-ratio wind turbine occurs at maximum aerodynamic lift. Maximum aerodynamic lift occurs when the propeller blades have an optimum angle of attack with the relative wind vector which is a combination of the actual wind vector and the wind vector resulting from propeller blade motion, i.e., the blade motion wind vector. Consequently, for a given actual wind velocity, a predetermined rotational speed exists at which the propeller blade is at an optimum angle of attack, producing maximum lift and maximum torque from the wind turbine, which in turn allows for maximum extraction of energy from the wind turbine system. Therefore, although the fixed-pitch wind turbine is more desirable from the standpoint of cost and reliability, the fixed-pitch wind turbine often does not provide optimum output power since it operates most efficiently only at its design pitch.

Several prior art devices have attempted to overcome this problem by matching the load of the wind turbine to its output. For example, U.S. Pat. No. 3,974,395 issued Aug. 10, 1976 to Bright, U.S. Pat. No. 4,095,120 issued June 13, 1978 to Moran et al., and U.S. Pat. No. 4,205,235 issued May 27, 1980 to Pal et al. disclose use of electronic circuits to control the current of field windings in generators and alternators and the addition of discrete loads in order to maintain maximum efficiency. The primary problem with these devices is that the electronic control circuitry operates in accordance with the rotational speed of the wind turbine. Of course, maximum efficiency can not be achieved strictly by sensing the rotational speed of the wind turbine since the wind turbine can be made to rotate at the same rotational speed for a wide range of actual wind speeds due to aerodynamic stall, thereby providing less than maximum power output. Additionally, these prior art devices vary load to the wind turbine by changing the amount of current to the field windings of a rotating excited field alternator or generator, both of which require slip rings or commutators which can wear or fail, thereby causing a high-rotational-speed-induced failure of the wind turbine. Moreover, these devices do not disclose an efficient manner of utilizing the electrical power generated.

U.S. Pat. Nos. 4,274,010 and 4,280,061 issued June 16, 1981 and July 21, 1981, respectively, to Lawson-Tancred disclose matching of power available from the wind to power delivered to the load using fixed-pitch wind turbines. Both of these devices, however, require mechanical safety devices in very high winds. Excessive complexity of these types of failure proof mechanisms increases cost. Moreover, the devices disclosed by Lawson-Tancred require conversion of energy to an intermediate form, i.e., hydraulic storage which further increases capital costs and results in significant decreases in efficiency.

U.S. Pat. No. 2,230,526 issued Feb. 4, 1941 to Claytor discloses another device which matches power available from a fixed-pitch wind turbine to the load. In the Claytor device, a wind driven generator is connected to an electric motor of larger capacity which operates a water pump. The nature of the interconnection of the generator and electric motor ensures that as power in the wind increases, so does power delivered to the load, until a point is reached where the turbine cannot supply sufficient power to the load under normally strong winds.

However, the Claytor device requires the use of a closely matched generator/motor combination which significantly increases capital costs of the system. Moreover, the motor transforms the electrical power generated by the generator to an intermediate form, i.e., mechanical energy which must then be used to perform some operation such as pumping water which further decreases system efficiency. An unlimited supply of water must also be provided with such a system. Of even more importance, the combined use of a generator and and motor in the Claytor device is capable of only preventing a high-rotational-speed-induced failure in normally strong winds. In abnormally strong winds, catastrophic failure is likely. Additionally, excessive wear or lack of maintenance of the generator brushes, failure, low charge, or freezing of the battery, or leakage or lack of water supply to the pump would also result in a high-rotational-speed-induced failure of the system.

SUMMARY OF THE INVENTION

It is therefore an object of the present invention to provide an economical wind turbine system.

It is also an object of the present invention to provide a wind turbine system which can be operated efficiently.

Another object of the present invention is to provide a wind turbine system which requires low capital cost.

Another object of the present invention is to provide a wind turbine system which is simple in operation.

Another object of the present invention is to provide a fixed-pitch wind turbine system.

Another object of the present invention is to provide a reliable and safe fixed-pitch wind turbine system.

Another object of the present invention is to provide a wind turbine system which generates directly electric power for storage in the utility grid.

Another object of the present invention is to provide a wind turbine system which prevents high-rotational-speed-induced failure in any wind speed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a fixed-pitch wind turbine system comprising: a fixed-pitch wind turbine; an alternator coupled to said fixed-pitch wind turbine, said alternator having an armature which produces an output voltage substantially proportional to the speed of rotation of said fixed-pitch wind turbine; means for regulating said output voltage of said armature to control said speed of rotation of said fixed-pitch wind turbine to optimize power delivered by said alternator and induce aerodynamic stall in said fixed-pitch wind turbine whenever said optimized output power exceeds a predetermined maximum.

The present invention may also comprise, in accordance with its objects and purposes, a fixed-pitch wind turbine system for economically converting available wind power to electrical power to be stored in an ac utility grid comprising: fixed-pitch wind turbine; alternator means for producing electrical power in response to rotation of said alternator by said wind turbine; control circuit means for transmitting a predetermined amount of said electrical power produced by said alternator means to said ac utility grid means to match said available wind power and thereby transmit a substantially optimum amount of power to said ac utility grid for said available wind power and to induce aerodynamic stall in said wind turbine by increasing said predetermined amount of power transmitted to said ac utility grid beyond said substantially optimum amount of power whenever said electrical power produced by said alternator means exceeds a predetermined maximum.

The present invention may also comprise, in accordance with its objects and purposes, a fixed-pitch wind turbine system comprising: a fixed-pitch wind turbine; alternator means having a permanent magnet rotor coupled to said wind turbine and a stator armature which produces a rectified voltage output substantially proportional to the speed of rotation of said permanent magnet rotor; utility grid means for providing a low impedance load; means for intermittently coupling said rectified voltage output from said armature to said utility grid means for a predetermined switching interval to control the average output voltage of said armature and thereby control said speed of rotation of said permanent magnet rotor to obtain a substantially optimum angle of attack of said fixed-pitch wind turbine to relative wind velocity to substantially optimize output power from said alternator means for actual wind speeds below a predetermined maximum speed above which aerodynamic stall is induced in said wind turbine by controlling the rotation speed of said rotor to increase the angle of attack of said wind turbine with said relative wind to an angle greater than said optimum angle of attack and thereby protect said wind turbine from overspeeding.

The present invention may also comprise, in accordance with its objects and purposes, a fixed-pitch wind turbine system comprising: a fixed-pitch wind turbine; an alternator coupled to said fixed-pitch wind turbine, said alternator having a permanent magnet rotor and a stator armature; rectifier filter means connected to said stator armature for producing a dc signal having a voltage magnitude which is proportional to the rotational speed of said wind turbine; low impedance utility grid means for providing a low impedance load; a forced commutation synchronous inverter coupled to said low impedance utility grid means; inductive impedance matching circuit means coupled between said rectifier filter means and said low impedance utility grid means for storing and returning current to said rectifier filter means which is not delivered to said low impedance utility grid means; control circuit means for producing phased switching signals to control said forced commutation synchronous inverter to connect said dc signal to said low impedance utility grid means for a predetermined phase interval which is dependent upon said voltage magnitude of said dc signal to thereby reduce said voltage magnitude by a factor sufficient to cause said fixed-pitch wind turbine to achieve a rotational speed which substantially optimizes output power from said alternator for rotational speeds of said wind turbine below a predetermined maximum rotational speed, such that aerodynamic stall is induced in said wind turbine by limiting said voltage magnitude of said dc signal to a predetermined maximum voltage which corresponds to said predetermined maximum rotational speed of said wind turbine.

The advantages of the present invention are that mechanical simplicity of the present invention is maintained to minimize capital costs while providing a device which substantially optimizes extraction of wind energy and conversion to electrical energy for efficient storage in the ac utility grid. The present invention uses an alternator having a permanent magnet rotor and a stator armature which requires no rapidly rotating or sliding electrical contacts which could fail and cause catastrophic destruction of the wind turbine. The permanent magnet alternator is more efficient at power levels below 20 kilowatts than the excited field winding alternator. Complex mechanical devices to prevent high-rotational-speed-induced failure which significantly increase cost and are inherently unreliable are not required in the present invention. Rather, multiple failsafe overspeed protection is achieved automatically in the present invention by the use of control circuitry for varying the load on the armature to induce aerodynamic stall even during failure of the low impedance load. The present invention also utilizes a highly efficient synchronous inverter for directly coupling electrical power generated by the alternator to the ac utility grid for storage.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
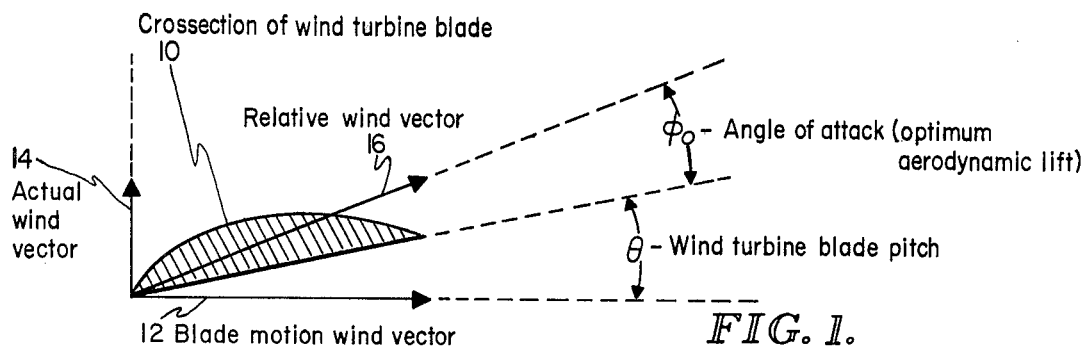
FIG. 1 is a vector diagram from the frame of reference of a rotating wind turbine blade illustrating an optimum angle of attack of the wind turbine blade with relative wind.

FIG. 1 is a vector diagram illustrating a cross-section of a wind turbine blade 10. Wind turbine blade 10 has a motion from right to left which produces a blade motion wind vector 12. Wind turbine blade 10 has a wind turbine blade pitch $\theta$ which remains constant relative to the blade motion wind vector 12 since a fixed-pitch wind turbine is illustrated. Actual wind vector 14 is perpendicular to the plane of motion of the wind turbine blade 10 as illustrated in FIG. 1. The wind turbine 10, of course, sees a combination of the blade motion wind vector 12 and actual wind vector 14 which is the relative wind vector 16. The relative wind vector 16 has an angle of attack $\phi$ with the wind turbine blade 10 which constitutes the total angle which the relative wind vector 16 makes with the plane of rotation of the wind turbine blade 10 minus the wind turbine blade pitch. FIG. 1 illustrates an optimum angle of attack $\phi_0$ which produces maximum aerodynamic lift of the wind turbine blade 10 which in turn produces maximum torque on the wind turbine such that optimum power can be extracted.

Figure 2:
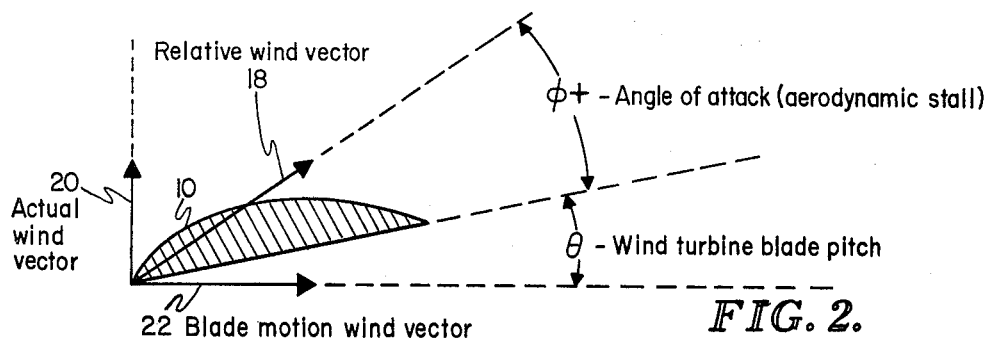
FIG. 2 is a vector diagram of the wind turbine blade 10 of FIG. 1 illustrating an angle of attack which is considerably greater than the optimum angle of attack.

FIG. 2 is a vector diagram of the wind turbine blade 10 illustrated in FIG. 1. As shown in FIG. 2, the rotational speed of the wind turbine has been decreased and, consequently, the velocity of the wind turbine blade 10 has been decreased such that the blade motion wind vector 22 is significantly less than blade motion wind vector 12 illustrated in FIG. 1. Actual wind vector 20 of FIG. 2 has the same magnitude as actual wind vector 14. The resultant relative wind vector 18 therefore has a different angle of attack $\phi_+$, which is considerably greater than the optimum angle of attack $\phi_0$ illustrated in FIG. 1. Again, the angle of attack $\phi_+$ illustrated in FIG. 2 has been produced simply by reducing the velocity of wind turbine blade 10 by controlling the rotational speed of the wind turbine such that the blade motion wind vector 22 is significantly reduced. This, of course, occurs under a constant actual wind vector. Less aerodynamic lift is obtained with the greater angle of attack $\phi_+$ illustrated in FIG. 2 than the optimum angle of attack $\phi_0$ illustrated in FIG. 1. It can be seen from FIG. 2 that as the blade motion wind vector 22 decreases for a constant actual wind vector 20, the angle of attack $\phi_+$ increases and less aerodynamic lift is generated on wind turbine blade 10. This condition is referred to as aerodynamic stall.

Figure 3:
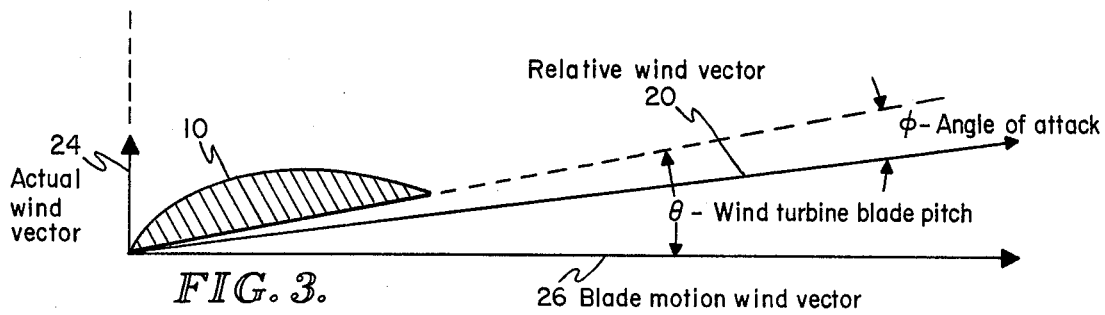
FIG. 3 is a vector diagram of the wind turbine blade of FIG. 1 illustrating an angle of attack which is less than the optimum angle of attack.

FIG. 3 is a vector diagram of the same wind turbine blade 10 illustrated in both FIGS. 1 and 2. As shown in FIG. 3, wind turbine blade 10 has a high rotational velocity causing blade motion wind vector 26 to have a greatly increased magnitude over blade motion wind vector 12 and blade motion wind vector 22. Actual wind vector 24 remains the same as actual wind vector 14 and actual wind vector 20 illustrated in FIGS. 1 and 2, respectively. Of course, wind turbine blade pitch $\theta$ also is the same as illustrated in FIGS. 1 and 2 since wind turbine blade 10 comprises a fixed-pitch wind turbine. As shown in FIG. 3, the resultant relative wind vector 24 causes the angle of attack $\phi_-$ of the wind turbine blade 10 to be less than the wind turbine blade pitch $\theta$. Consequently, negative aerodynamic lift is generated under the influence of actual wind vector 24, slowing the turbine.

Figure 4:
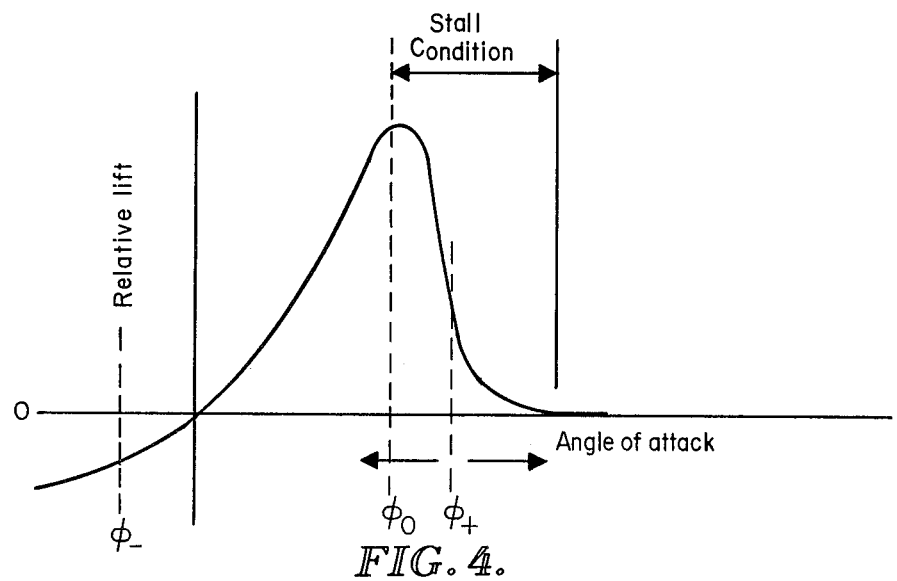
FIG. 4 is a graph of relative lift versus angle of attack for the wind turbine blade of FIGS. 1-3 assuming a constant actual wind speed.

FIG. 4 is a graph of relative lift versus angle of attack for the fixed-pitch wind turbine illustrated in FIGS. 1-3, assuming a constant actual wind speed and a varying wind turbine rotational speed. As illustrated in FIG. 4, optimum relative aerodynamic lift occurs at the optimum angle of attack $\phi_0$. Angles of attack greater than $\phi_0$, such as $\phi_+$, produce less relative aerodynamic lift. Similarly, angles of attack less than $\phi_0$ also produce less relative aerodynamic lift and, angles of attack such as $\phi_-$ produce negative aerodynamic lift.

From the information disclosed in FIGS. 1-4, it is apparent that complete control of a fixed-pitch wind turbine system can be accomplished by using the aerodynamic effects of the wind turbine blades to not only extract optimum energy, but also prevent overspeeding of the wind turbine and thereby prevent high-rotational-speed-induced failure in high winds simply by controlling the load on the wind turbine and thereby controlling the rotational speed and, consequently, control the blade motion wind vector to produce the desired angle of attack of the wind turbine blade with the relative wind vector. Using this concept, the mechanical complexities of the variable-pitch wind turbine are not needed to either extract optimum power or prevent high-rotational-speed-induced failures. In other words, the blade motion wind vector can be controlled by controlling the rotational speed of the wind turbine to produce the desired angle of attack. Up to a predetermined rotational speed and optimum angle of attack $\phi_0$ is normally desired. Above a predetermined rotational speed at which high-rotational-speed-induced failure is likely to occur, the angle of attack can be increased by simply increasing the load on the wind turbine to decrease the blade motion wind vector. When this occurs, aerodynamic lift decreases such that loading of the wind turbine also decreases to maintain a predetermined blade motion wind vector. This cumulative effect can be used to extract wind energy in even very high actual wind speeds by operating the wind turbine in a partially stalled condition without the risk of causing a high-rotational-speed-induced failure.

Figure 5:
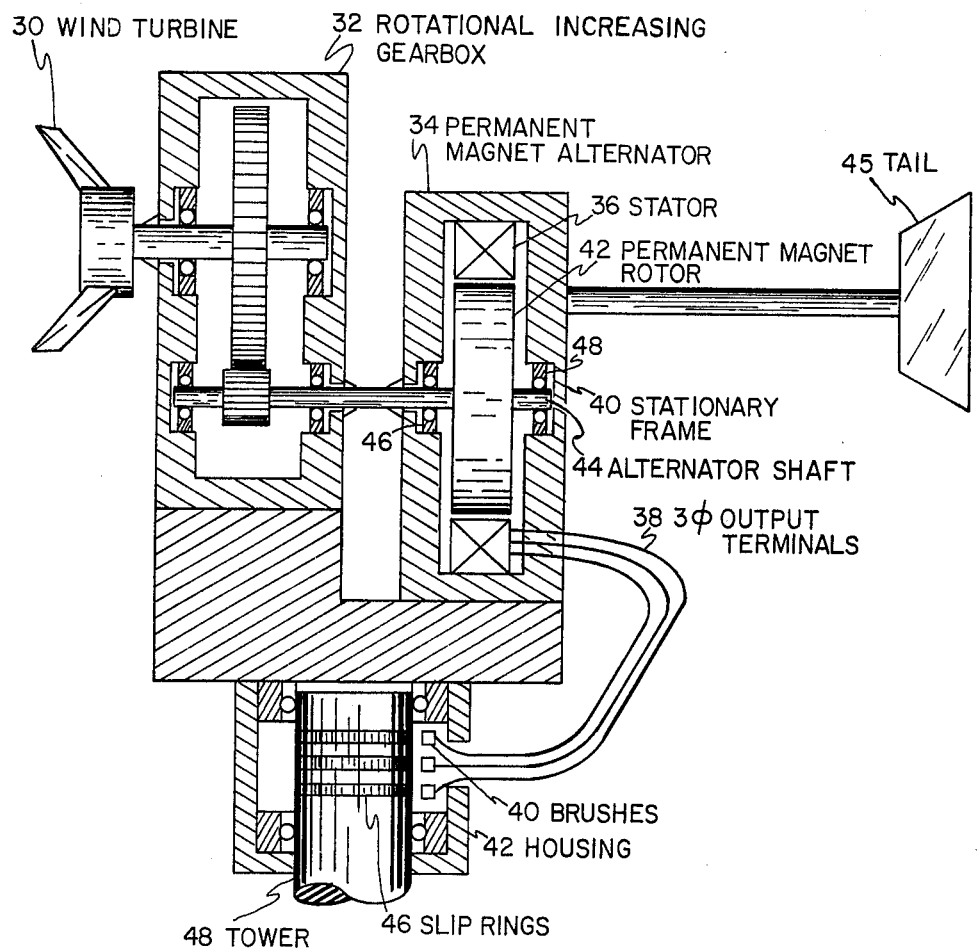
FIG. 5 is a schematic diagram of one embodiment of the mechanical assembly of the device of the present invention.

FIG. 5 discloses the mechanical assembly of one embodiment of the present invention. FIG. 5 discloses an extremely simple and low cost mechanical assembly having extremely good reliability and requiring relatively low capital investment. The mechanical assembly of FIG. 5 utilizes a 17 foot diameter fixed-pitch conventional three blade high-tip-speed-ratio wind turbine 30 which has an operating speed of about 180 rpm in a 20 mph wind at load. The wind turbine 30 is connected to a 10:1 speed increasing gear box 32 which is used to increase the turbine shaft rotational speed to match the characteristics of the permanent magnet alternator 34. The permanent magnet alternator is rated at 208 V, three-phase, 5 kW at 1800 rpm. Permanent magnet alternator 34 has an efficiency of about 90% at rated load, which is much greater than the efficiency of other types of alternators or generators such as excited field alternators and generators, at output levels below 10 kW. Permanent magnet alternator 34 has a stator armature 36 with three-phase output terminals 38 which are fixed to the stationary frame 40 of the alternator. Consequently, no brushes or slip rings, which are prone to failure, are required to couple electrical power from the permanent magnet alternator 34. Permanent magnet alternator 34 utilizes a permanent magnet rotor 42 which is coupled to the rotating shaft 44 of the alternator. The permanent magnet rotor 42 is a solid composite pressed to alternator shaft 44 which is carried on large bearings 46 and 48. Since rotation of the permanent magnet rotor 42 generates an electric signal in the stator armature 36, no electrical contacts are necessary to the rotating components of permanent magnet alternator 34.

The mechanical assembly and required electrical contacts could therefore not be any simpler or more reliable. The complete assembly only has one rotating part and requires no moving electrical contacts. Permanent magnet alternator 34 produces an output voltage and frequency which increase approximately linearly with rotational speed, is not damaged by a short circuit across the stator armature output terminals, and does not require any field current or auxilliary power source in order to generate electricity. The three-phase output terminals 38 of stator armature 36 are connected directly to brushes 40 which are attached to the housing 42 which rotates according to wind direction by forces produced on tail 44 causing the entire gear box-alternator-turbine assembly to point into the wind. Slip rings 46 are attached to tower 48 and couple electrical power produced by stator armature 36 by brushes 40. Although the brushes 40 and slip rings 46 constitute a moving electrical contact, such an electrical contact is extremely reliable since it is a slow moving electrical contact having very little wear and, consequently, a long usable lifetime.

Figure 6:
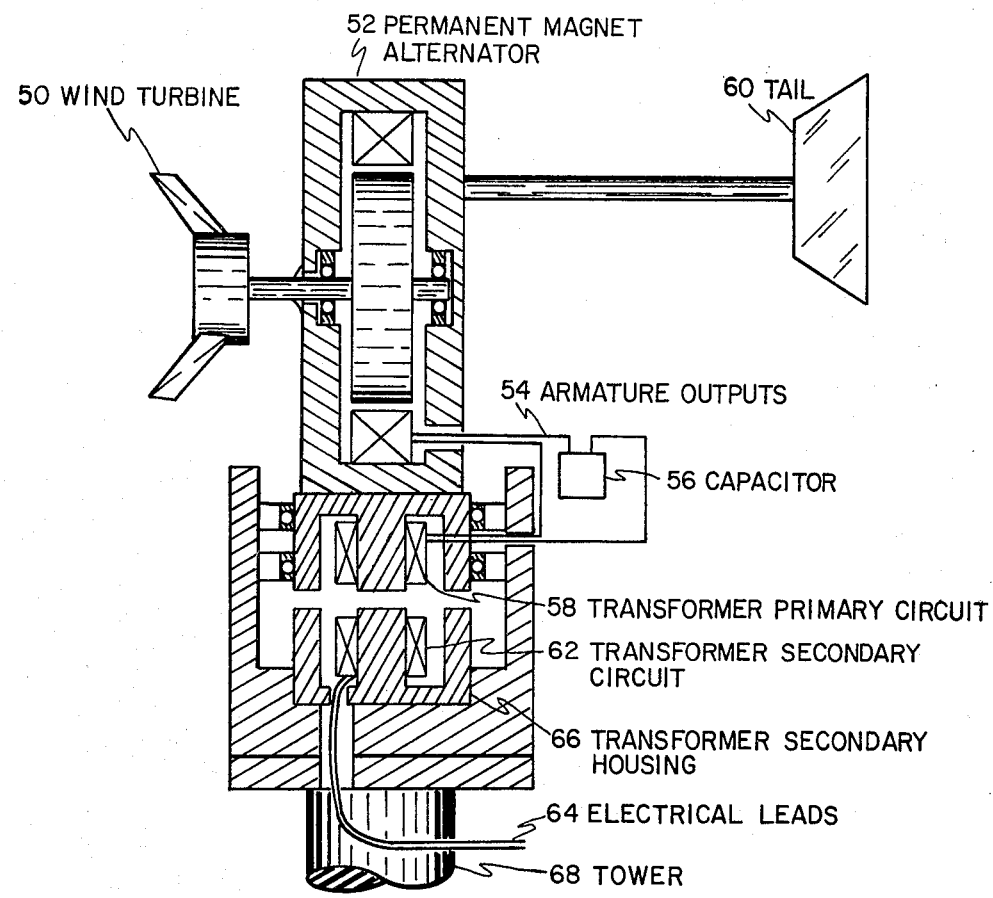
FIG. 6 is a schematic diagram of the mechanical assembly of another embodiment of the present invention.

FIG. 6 discloses another embodiment utilizing an even simpler mechanical assembly which eliminates the brushes 40 and slip rings 46 of the embodiment of FIG. 5. The embodiment of FIG. 6 comprises a wind turbine 50, which is the same as wind turbine 30 disclosed in the embodiment of FIG. 5. Wind turbine 50 is coupled to a permanent magnet alternator 52 which is designed to produce 5 kW at 208 V, single phase, 400 Hz at 180 rpm. Permanent magnet alternator 52 is somewhat larger and more costly than the rotational speed increasing gear box 32 and permanent magnet alternator 34 combination of the embodiment of FIG. 5, but is much simpler. The armature outputs 54 of the permanent magnet alternator 52 are coupled through a 500 $\mu$F capacitor 56 to a transformer primary circuit 58 which is attached to permanent magnet alternator 52 and free to rotate with wind direction by forces produced on tail 60. Capacitor 56 functions to prevent transformer primary winding 58 from short circuiting the alternator and stalling the turbine at very low speeds, which would otherwise prevent the device from starting. Electrical leads 64 couple electrical power from the transformer secondary circuit 62. The transformer secondary circuit 62 and transformer secondary housing 66, as well as the electrical leads 64, are fixed to the stationary tower 68. The transformer primary and secondary circuits are free to rotate with respect to each other and function to couple electrical energy from the rotating alternator assembly to the stationary tower. The primary and secondary circuits are cylindrically symetric with regard to the vertical axis of rotation.

Figure 7:
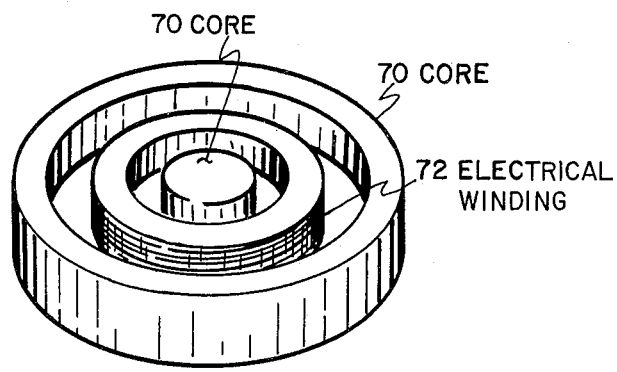
FIG. 7 is a schematic diagram of a coupling transformer for use with the mechanical assembly illustrated in FIG. 6.

FIG. 7 is a schematic perspective view of a section of the transformer illustrated in the preferred embodiment of FIG. 6. Core 70 is fabricated from electrical steel. The electrical winding 72 is disposed in core 70 as illustrated in FIG. 7. The approximate 400 Hz output frequency of permanent magnet alternator 52 at nominal output makes it possible for the coupling transformer and capacitor to be small and essentially no more costly than brushes 40 and slip rings 46 of the embodiment of FIG. 5. Both the mechanical assemblies of the embodiments of FIG. 5 and FIG. 6 have few moving parts and, consequently, very high reliability because they require few electrical contacts and utilize a fixed-pitch wind turbine.

Figure 8:
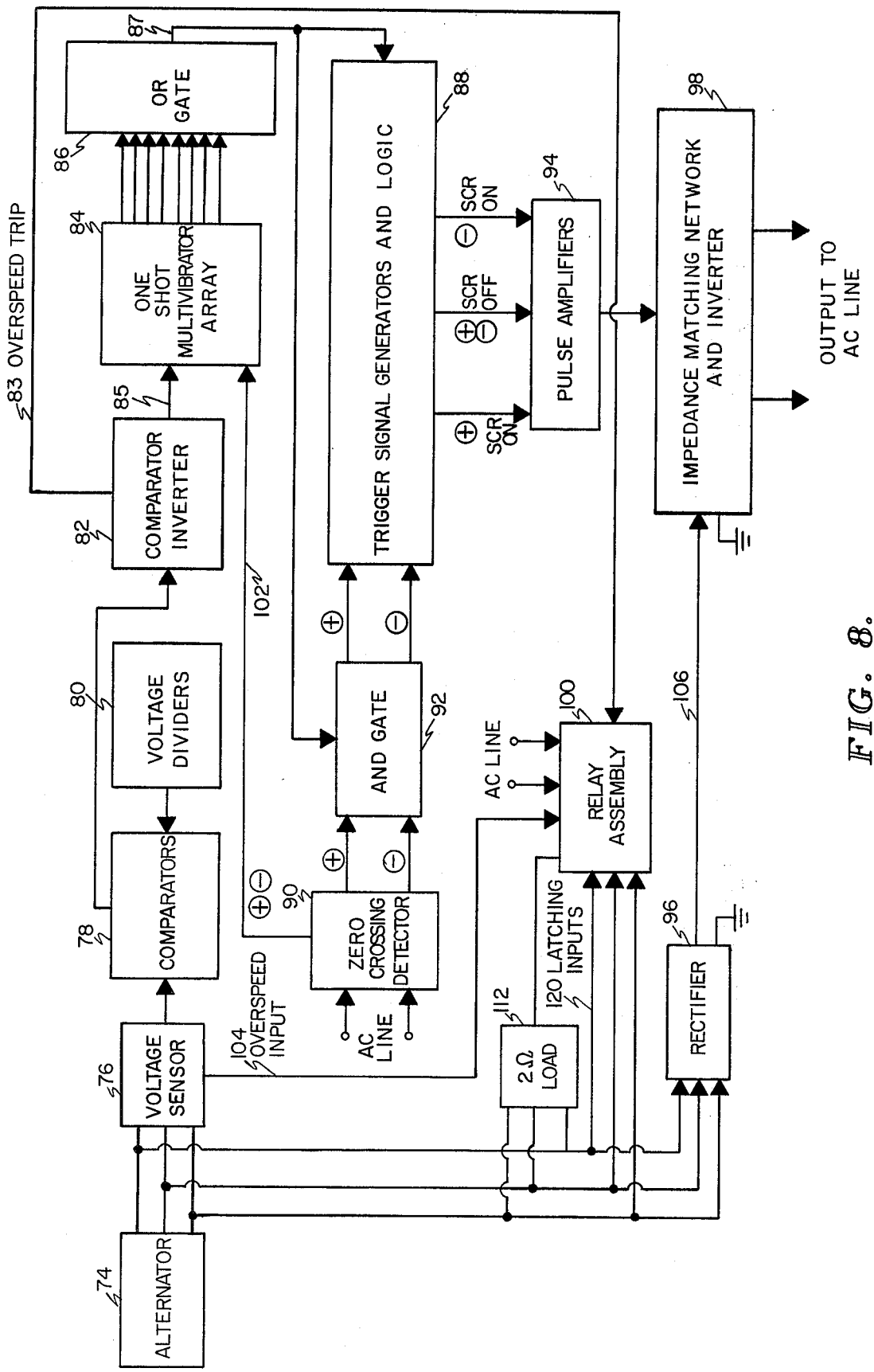
FIG. 8 is a schematic block diagram of the electronic circuitry of the device of the preferred embodiment of the invention.

FIG. 8 is a schematic block diagram of the control circuitry of the device of the present invention. As illustrated in FIG. 8, alternator 74 produces a three-phase ac voltage output. To enable proper operation of the remaining circuitry, the voltage sensor 76 converts the three-phase ac voltage produced by alternator 74 to a lower dc voltage proportional to the voltage output of alternator 74. The dc voltage signal produced by voltage sensor 76 is isolated from the alternator. The voltage output of voltage sensor 76 is fed to comparators 78 which compare the dc voltage signal from voltage sensor 76 with eight reference voltages produced by voltage dividers 80. Comparator 78 produce an output which is applied to comparator inverter 82. Comparator inverter 82 produces two outputs 83 and 85. Output 83 comprises an overspeed trip control signal which is applied to relay assembly 100. Output 85 of comparator inverter 82 comprises the inverted comparator signals from comparator 78 which is applied to the reset terminals of one-shot multivibrator array 84.

Triggering signals for one-shot multivibrator array 84 are provided by output 102 of zero-crossing detector 90. Output 102 provides a triggering pulse at both positive and negative zero-crossings of the ac line. The output of one-shot multivibrator array 84 comprises a series of parallel output pulses, the longest of which is representative of the output voltage of alternator 74. OR gate 86 provides the proper logic circuitry for producing a single output 87 having a pulse width representative of alternator 74. Output 87 of OR gate 86 is applied to both AND gate 92 and trigger signal generators and logic 88. Zero-crossing detector 90 also produces separate signals indicative of both positive and negative going zero-crossings which are applied to AND gate 92. AND gate 92 functions to instantaneously prevent the trigger signal generators and logic 88 from producing positive SCR and negative SCR ON signals when no ac line signal is available. Trigger signal generators and logic 88 also assure that the positive and negative SCR OFF signal occurs at either the instant of ac line failure or one millisecond after the last detected zero-crossing, whichever occurs later.

The positive going SCR ON signal, the negative going SCR ON signal and the positive and negative going SCR OFF signal are applied to pulse amplifiers 94 which produce the proper pulse signal for switching SCR's in the impedance matching network and inverter 98. Rectifier 96 provides a separate rectified voltage output signal which is applied directly to the impedance matching network and inverter 98. Rectifier 96 is capable of rectifying and transmitting the full power load produced by alternator 74. Relay assembly 100 comprises a series of relays which couple 2 ohm load 112 to the alternator armature output whenever conditions warrant. Latching inputs 120 cause relay assembly 100 to connect the 2 ohm load 112 to the armature output whenever the alternator voltage exceeds a predetermined maximum voltage. Similarly, relay assembly 100 connects the 2 ohm load 112 to the armature output whenever ac line voltage is not present. Also, overspeed input control signals 104 and 83 are provided by voltage sensor 76 and comparator inverter 82 to couple the 2 ohm load to the armature output of alternator 74 whenever predetermined voltages are reached at these outputs.

Figure 9:
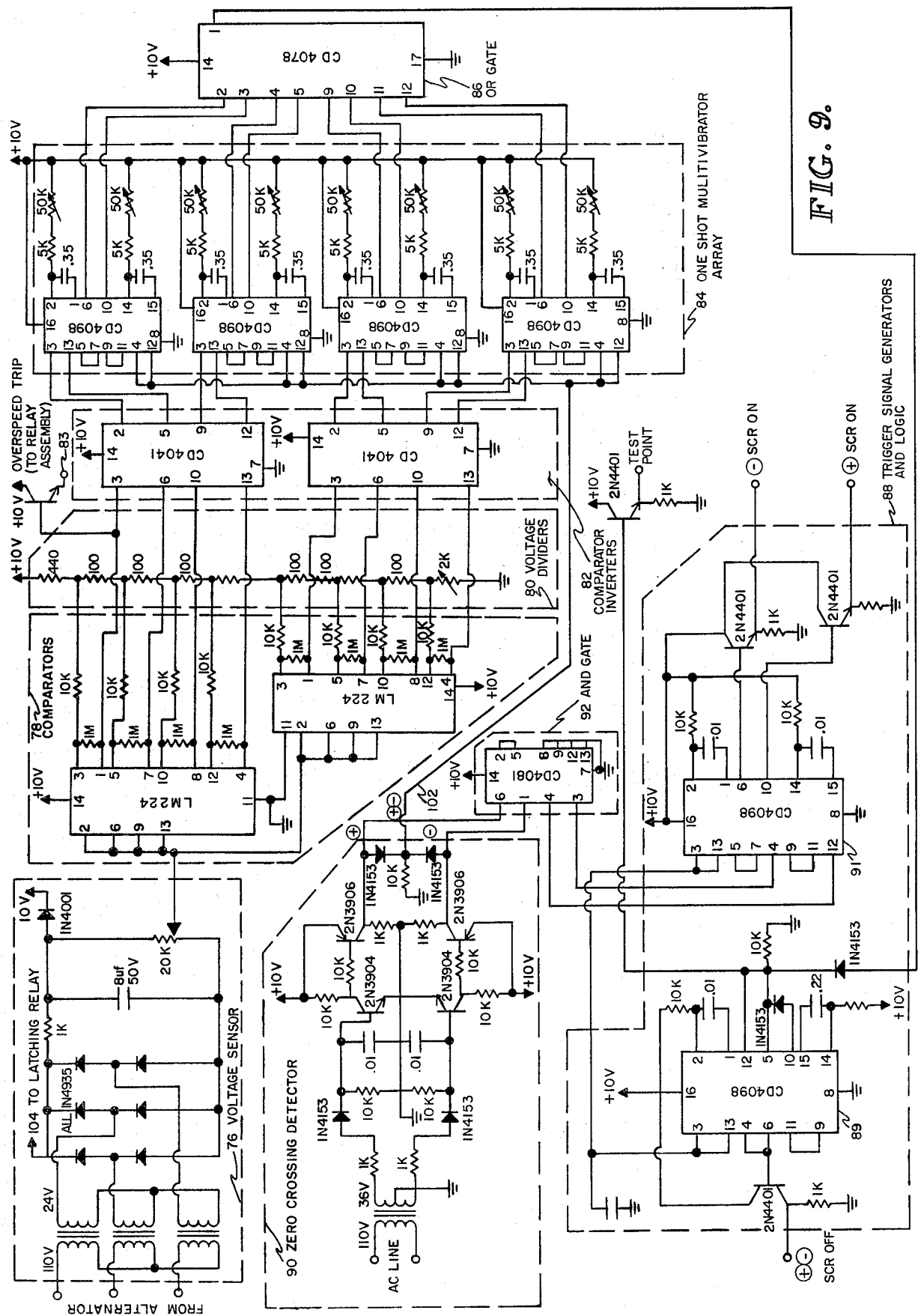
FIG. 9 is a schematic circuit diagram of various portions of the control circuitry of the device of the present invention.

FIG. 9 is a schematic diagram of voltage sensor 76, comparators 78, voltage dividers 80, comparator inverters 82, one-shot multivibrator array 84, OR gate 86, trigger signal generators and logic 88, zero-crossing detectors 90, and AND gate 92. The schematic circuit diagram of FIG. 9 discloses in detail the various components used for these devices. These electrical circuits sense armature output voltage, apply a known load to the armature, and generate firing signals for SCR's in the impedance matching circuitry and inverter. Timing signals are obtained from the ac utility grid to insure synchronism. The load applied to the alternator is such that for safe turbine rotational speeds, good matching between power available in the wind and power delivered to the ac utility grid is achieved. For turbine speeds at the high end of the safe operating region, load matching is deliberately changed to provide much higher power extraction from the alternator than is available in the wind, thereby causing partial aerodynamic stall and hence slowing of the rotational speed of the wind turbine.

Figure 10:
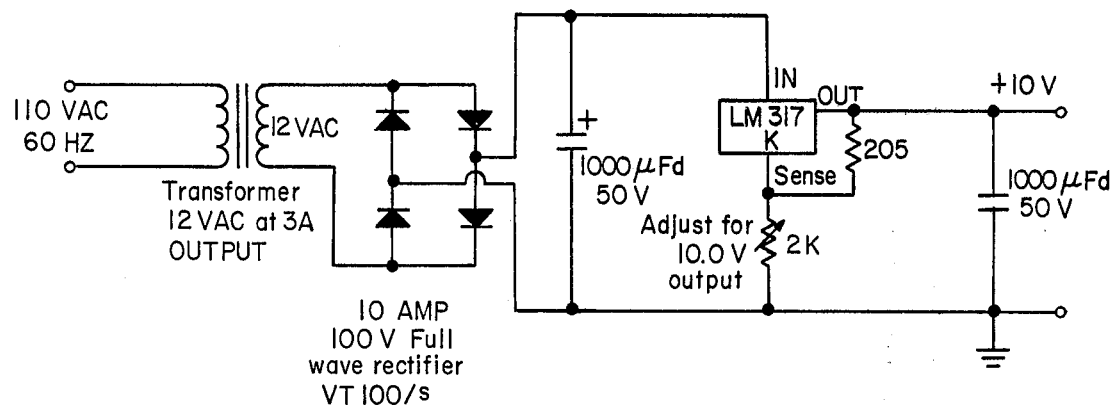
FIG. 10 is a schematic circuit diagram of the power supply of the device of the present invention.

FIG. 10 discloses the power supply utilized in the device of the present invention. The power supply disclosed in FIG. 10 provides a stable voltage which is applied to all logic circuit elements to insure accurate sensing of alternator voltage and reliable and consistent operation of the SCR firing circuits. In addition, if a power failure occurs in the ac line, power to the logic circuitry must be maintained for at least two full cycles of the ac line, i.e., 33 ms, to insure orderly shutdown of the inverter. The circuitry disclosed in FIG. 10 provides the desired characteristics and has an output voltage of 10 V dc at 1.2 amps.

FIG. 9 also discloses a voltage sensor 76 which is coupled to the alternator armature through a three-phase transformer. The alternator armature output voltage must be sensed by the logic circuitry of the present invention to determine the proper load to be applied. This is achieved by transforming and rectifying the alternator output as disclosed in the circuit diagram of voltage sensor 76 in FIG. 9. Since it is desirable to operate the comparators of the present invention in a voltage range of 0–8.5 V, the 20 kΩ potentiometer is adjusted so that for an alternator voltage of 240 V, the comparator output is 8 V.

Figure 11:
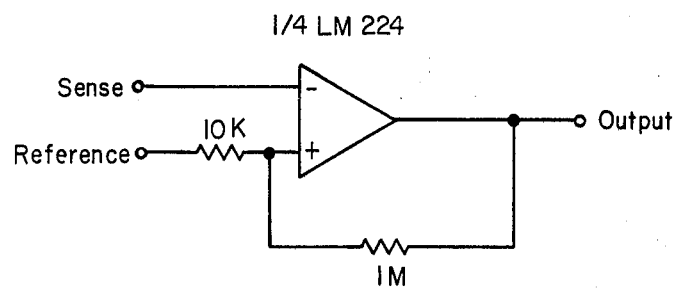
FIG. 11 is a schematic circuit diagram of a comparator of the present invention.

FIG. 11 discloses one of the eight comparators disclosed in comparator circuitry 78 of FIG. 9. Each of the LM224 integrated circuits has four operational amplifiers such as disclosed in FIG. 11. The output of the voltage sensor is connected in parallel to the sense terminals of the eight identical comparator circuits which contain hysteresis. Each comparator is constructed using one operational amplifier of the LM224 quad op-amp array as schematically illustrated in FIG. 11. For a sense voltage less than the reference voltage, the comparator output is 8.5 V. As the sense voltage rises above 101% of the reference voltage, the comparator output goes to 0 V. The sense voltage must, however, drop below approximately 99% of the reference voltage for the output to rise to 8.5 V again. Thus, about 2% hysteresis is provided.

Figure 12:
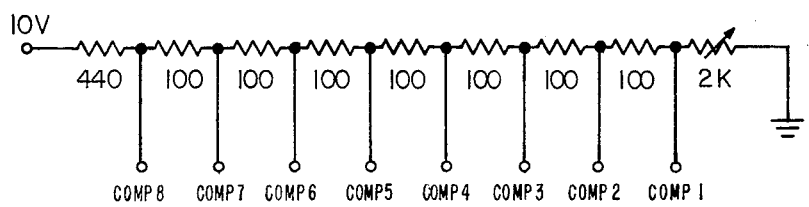
FIG. 12 is a schematic circuit diagram of a voltage divider of the present invention.

FIG. 12 discloses the voltage divider circuit also disclosed in FIG. 9. The voltage dividers 80 provide the reference voltage for comparators 78. As illustrated in FIG. 12, the voltage divider has a 2 kΩ potentiometer adjustment so that the voltage at the reference terminal of the first comparator can be adjusted for an alternator voltage of 150 V, corresponding to an output of 5.0 V from the output of the 20 kΩ potentiometer of voltage sensor 76 illustrated in FIG. 9. This causes comparator 1 to trip while an alternator voltage of 240 V or 8.0 V at the output of the 20 kΩ potentiometer of voltage sensor 76 causes the eighth comparator to trip.

The comparator inverters 82, illustrated in FIG. 9, invert the output of comparator 78 utilizing two CD4041 quad true/complement buffers so that the output of each buffer is 10 V if the sense voltage of a comparator is greater than the reference voltage, and 0 V if it is less. In addition, the noninverted output of the eighth comparator is amplified and provides an overspeed trip output illustrated in FIG. 9 which is applied to the relay assembly. It should be noted also that the inverted output can also be amplified to provide an inverted overspeed trip output signal.

The zero-crossing detector 90 illustrated in FIG. 9 provides correct synchronization of the inverter with the ac power grid. Zero-crossing detector 90 provides signals which precisely indicate the instant the ac line voltage is zero and whether the ac line voltage is positive going or negative going at the zero-crossing. The circuitry illustrated in FIG. 9 provides two square wave pulse trains, one of which rises from 0 to 10 V, 50 μs after the positive zero-crossing, remains at 10 V until 50 μs before the negative zero-crossing and drops to 0 V from 50 μs before the negative zero-crossing to 50 μs after the positive zero-crossing. The other pulse train does the same but makes the transition from 0 V to 10 V 50 μs after the negative zero-crossing. The combined positive and negative output of the zero-crossing detector 90 provides the sum of the two pulse trains.

Figure 13:
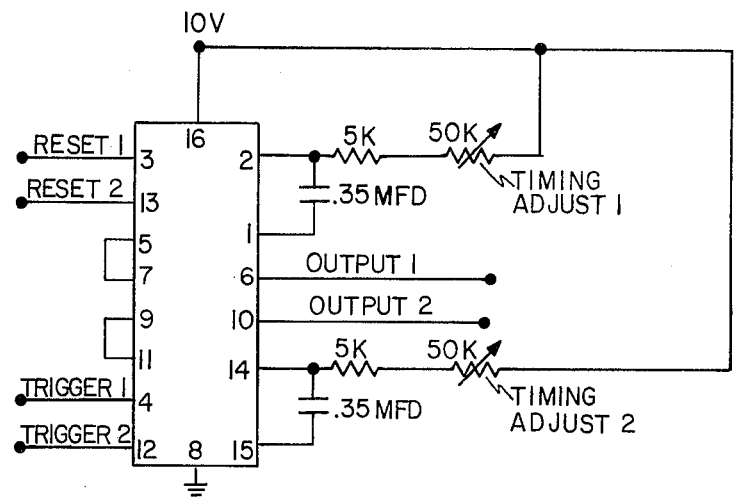
FIG. 13 is a schematic circuit diagram of typical dual one-shot multivibrators utilized in the device of the present invention.

FIG. 13 discloses a single CD4098 integrated circuit utilized in the one-shot multivibrator array 84. To determine the power drawn from the alternator to be fed to the power line, it is necessary to generate a square wave pulse train wherein the voltage is always zero if no power is to be fed to the line and which increases from 0 to 10 V at either line zero-crossing and remains at 10 V for a time which is always less than one ac line half period, i.e., 8.33 ms, if power is to be fed to the line. The time that the pulse train is at 10 V determines the amount of power transferred. For short times, little power is transferred, and for longer times, more power is transferred. To generate the pulses of the required length, four CD4098 dual one-shot multivibrators, such as illustrated in FIG. 13, are used to provide a total of eight multivibrators. Each multivibrator generates a single pulse each time it receives a trigger signal if the reset terminal of the particular multivibrator is at 10 V. The length of the pulse is determined by the resistance and capacitance connected to the timing terminals. The length of the pulses are adjusted by the 50 kΩ potentiometers illustrated in FIG. 13. The trigger inputs of all eight multivibrators are connected in common to the positive going and negative going zero-crossing detector signal 102, so that a trigger signal is received by each multivibrator at every zero-crossing. Therefore, if the ac line voltage fails, no signals are generated, thereby preventing the inverter 98 of FIG. 8 from delivering power to the ac grid. This protects workers attempting to repair a broken power line from electrical hazard of the wind generator.

Even though each multivibrator receives a trigger signal at each zero-crossing, no pulse will be generated unless the reset terminal of the multivibrator is at 10 V. This is achieved by connecting one reset terminal to each output of comparator inverters 82. Thus, if the first comparator trips, it applies 10 V to the reset terminal of the first multivibrator only, thereby enabling the first multivibrator to generate a pulse if it receives a trigger signal. The same is true for the other seven multivibrators. Each multivibrator output is connected to one input of the CD4078 chip which comprises OR gate 86 illustrated in FIG. 9. The output of OR gate 86 is 0 if no reset terminals of the multivibrators are at 10 V. If one or more reset terminals are at 10 V and if the zero-crossing detector indicates that line voltage is present, then the output of the OR gate is a pulse beginning at the zero-crossing, and ending when the output of the activated multivibrator which generates the longest duration pulse returns to 0. Thus the length of the pulse at the output of OR gate 86 at each zero-crossing of the ac line is determined by which multivibrator reset lines are at 10 V, which is a representation of the alternator output voltage. For alternator voltages below 150 V, no reset pulses are produced. For voltages of 150 V to 165 V, a pulse lasting 1.2 ms is produced. Progressively longer pulses are produced in the multivibrator array up to an alternator voltage of 240 V where a 6.8 ms long pulse is produced. The length of the intermediate pulses is adjusted empirically to provide the correct amount of power extraction from the alternator to maintain a load substantially equal to the power available in the wind at the rotational speed of the turbine corresponding to a given output voltage of the alternator under load. Thus, if the turbine is capable of generating 2.5 kW in a steady 20 mph wind at an alternator output voltage of 190 V, then the highest set comparator tripped at 190 V will enable the reset terminal of the multivibrator which produces a pulse of a length such that the inverter delivers approximately 2.5 kW to the ac grid, thereby keeping the turbine rotational speed constant in the 20 mph wind.

Figure 14:
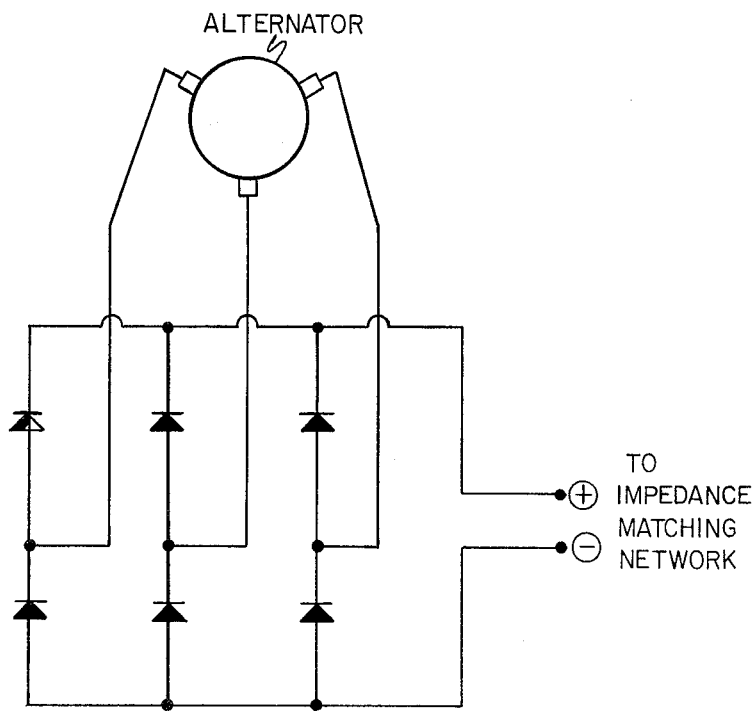
FIG. 14 is a schematic circuit diagram of the fullwave rectifier of the device of the present invention.

FIG. 14 schematically illustrates rectifier 96 disclosed in FIG. 8. Rectifier 96 comprises a three-phase rectifier having six diodes capable of delivering 50 amps at 600 PIV. The rectified output signal is applied directly to the impedance matching network illustrated in FIG. 15. To deliver power to the ac grid, pulses are required to turn on SCR 1 and SCR 6 illustrated in FIG. 15, at all zero-crossings when power is to be extracted, and pulses to SCR 2 and SCR 4 at each positive zero-crossing and pulses to SCR 3 and SCR 5 at each negative zero-crossing. A pulse is applied to SCR 7 at the end of each pulse generated by OR gate 86. Each of these pulses is approximately 50 μs long.

Figure 15:
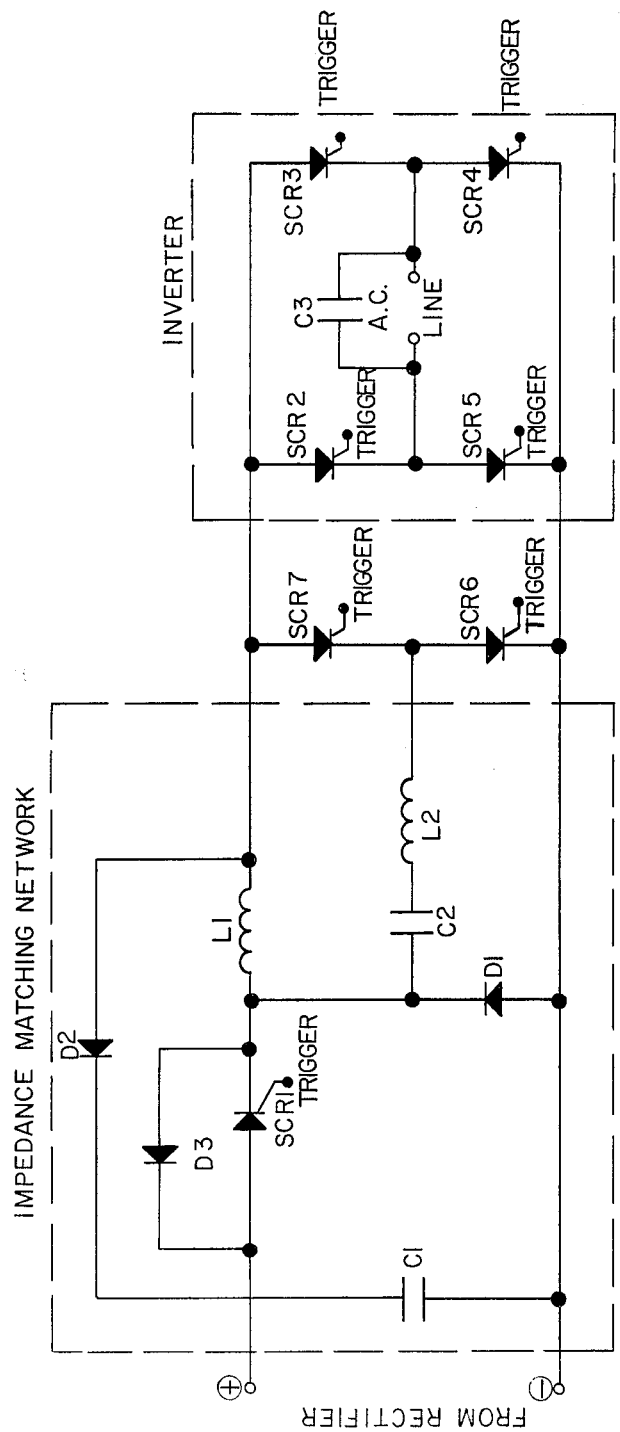
FIG. 15 is a schematic diagram of the impedance matching network and inverter of the device of the present invention.

To insure safe operation of the inverter and impedance matching network illustrated in FIG. 15, various timing conditions must be provided. The trigger signal generators and logic 88, AND gate 92, and zero-crossing detector 90 of FIG. 9 function to provide the negative SCR turn-on signal, the positive SCR turn-on signal, and the positive and negative SCR turn-off signal. These signals are applied to the trigger circuits illustrated in FIG. 16 which generate the various SCR trigger signals disclosed.

Figure 16:
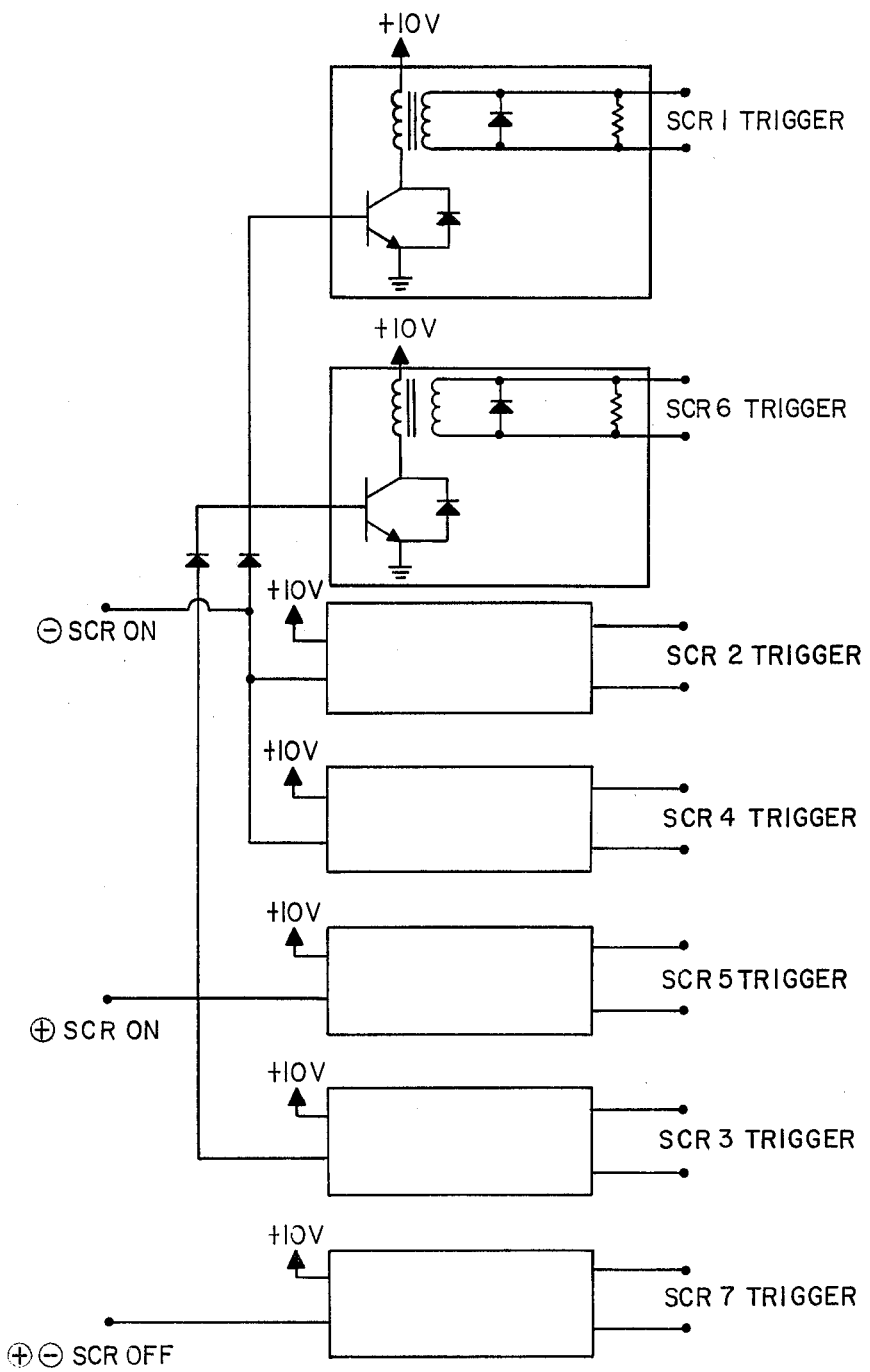
FIG. 16 is a schematic circuit diagram of pulse amplifier circuitry utilized in the device of the present invention.

The control circuitry of FIG. 9, in combination with the trigger circuitry of FIG. 16, provide trigger signals under the following conditions: (1) the pulse to SCR 7 never occurs sooner than 1 ms after the pulse to SCR 6, otherwise, a short circuit could occur damaging all seven SCR's; (2) when a pulse is provided to SCR 1, a pulse is also provided to SCR 7 not later than 7 ms after the pulse to SCR 1, otherwise, SCR 1, SCR 2, SCR 3, SCR 4, and SCR 5 could all be short circuited and damaged. The two dual multivibrators 89 and 91 of trigger signal generator and logic 88 function to provide the trigger signals under the conditions disclosed above as follows. Dual multivibrator 91 has both of its sections set up to deliver 50 μs pulses unconditionally upon receipt of a positive going edge of a square pulse. Dual multivibrator 89 has one section set to deliver a 1 ms pulse unconditionally upon the receipt of a positive going edge of a trigger signal, and the second section set to deliver a 50 μs pulse unconditionally upon the receipt of a negative going edge of a trigger signal. The positive zero-crossing detector output is fed to one input of one section of AND gate 92 while the negative zero-crossing detector output is fed to one input of a second section of AND gate 92. The remaining two sections of the AND gate are not used. The remaining inputs of the two sections of the AND gate 92 are connected in common to the output of the OR gate which generates the pulse determined by the eight comparators. If the ac line is positive and the alternator output voltage is sufficient to cause a pulse to be generated, then the output of the first section of AND gate 92 generates a pulse which triggers dual multivibrator 91 to generate a 50 μs pulse which is the positive SCR ON output. If the ac line is negative, the output appears as the negative SCR ON output in FIG. 9.

The pulse output of the OR gate is also connected to the input of the section of dual multivibrator 89 which produces a 1 ms pulse, and to the input of the negative-edge-triggered section of dual multivibrator 89 which produces a 50 μs pulse. In addition, the 1 ms output pulse of dual multivibrator 89 is also connected to the input of the 50 μs section of dual multivibrator 89. Therefore, the 50 μs pulse of dual multivibrator 89 is produced under the following conditions: (1) if the output pulse of the OR gate drops to zero at least 1 ms after it began, the 50 μs pulse is produced upon cessation of the OR gate pulse; (2) if the ac line fails or a circuit failure occurs less than 1 ms after the beginning of the output pulse of the OR gate, the 50 μs pulse is produced 1 ms after the beginning of the OR gate pulse; (3) if the logic circuit power supply fails, the 50 μs pulse is produced 1 ms after the last OR gate pulse; (4) if the OR gate produces a pulse under any circumstances, the 50 μs pulse always follows. The 50 μs pulse is illustrated in FIG. 9 as the positive-negative SCR OFF signal output.

Figure 17:
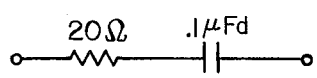
FIG. 17 is a schematic diagram of a snubber circuit utilized in the device of the present invention.

FIG. 17 discloses a snubber circuit used across each SCR and diode of the inverter circuit of FIG. 15.

Conversion of the output of the wind turbine alternator to a form appropriate for delivery to the ac power grid is complicated by several factors. The alternator produces variable voltage, variable frequency, variable power, three-phase ac, and has a low output impedance. The ac grid voltage is of a fixed frequency and voltage but also has a very low impedance. Consequently, a direct electrical path of any sort between the alternator and line will immediately produce large damaging current surges because of the low impedances of the source and sink. An ordinary line- or forced-commutated synchronous inverter cannot be used. Use of a resistor to limit surges would waste large amounts of power and use of an inductor between the rectified alternator output and a conventional inverter would not recover the large amount of energy stored in the inductor each half cycle. An inductor would also produce very high voltage spikes as the inverter switches. The prior art approach to these problems is typically to ignore them and simply allow the device to operate with large voltage and current surges and hope that the inverter does not destroy itself. However, it is still true that for such circuits the average alternator current must equal the average current supplied to the ac line, and hence correct transfer of power will occur only at one voltage and wind power level, and variation of the amount of power transferred will be limited to excursions smaller than necessary for proper matching.

In some commercial devices, all of the above effects are present as well as the problems associated with a line commutated inverter. The line commutated inverter causes both the alternator and ac line to be short circuited if a transient in the ac line voltage occurs or if the alternator output exceeds a critical value of about 200 V for a 120 V line voltage, which is not an uncommon occurence.

The impedance matching network and inverter illustrated in FIG. 15 circumvents all of the above problems in an extremely efficient and reliable manner. The basic concept of the circuitry of FIG. 15 is the use of an inductor L1 to temporarily store the difference in energy between that given up by the alternator and that received by the power grid during each half cycle. Then, before the end of each half cycle, the inductor L1 returns the stored energy to the alternator via SCR 1 and diodes D1 and D2. In this manner, no energy is dissipated except for the normal, and very small, switching losses of the silicon controlled rectifiers. Hence, all net energy taken from the alternator is received by the ac grid and the alternator voltage and current can be different from the ac line voltage and current, which is an extremely important factor for efficiently coupling of power to the ac grid.

Referring again to FIG. 15, once the circuitry of FIG. 9 has determined that power is to be extracted from the alternator, it generates several 50 μs duration pulses all occuring approximately 80 μs after the ac line zero-crossing. These pulses are applied to the gates of SCR 1, SCR 6, and either SCR 2 and SCR 4, or SCR 3 and SCR 5, depending on whether the zero-crossing is positive or negative. This is the only time that such differentiation is made, and the operation of the remaining circuitry is independent of this differentiation. At this point in time, SCR 1 and, for example, SCR 2 and SCR 4, are conducting and may be imagined to the closed switches. The alternator voltage minus the absolute value of the instantaneous line voltage appears across L1 and current begins to flow to the ac line. Because of the nature of inductors, the current in the ac line rises smoothly from zero with no surges. The current flows from the alternator input connections through L1 and into the ac line. At the instant that SCR 1 is turned on, SCR 6 is also turned on. This sets up a one quarter cycle "ring" in L2 and C2 which takes about 100 μs, at which point C2 charges to nearly twice the alternator voltage. Current through L2 begins to reverse, turning-off SCR 6. When current through SCR 1 and the ac line reaches a value consistent with the total power to be delivered to the ac line during that half cycle (as determined by the alternator characteristics, the ac line voltage, and the stall control circuit), the stall control circuit sends the positive/negative SCR OFF trigger signal to SCR 7. This connects C2 (charged to twice the alternator voltage) through L2 across L1. The value of C2 and L2 is chosen to be such that when SCR 7 is turned on, L2 and C2 act as a current sink able to handle more than the maximum load current ever expected, i.e., 150 amps. For about 25 μs, then, L2 and C2 divert all the current flowing to the ac line back to C2 and through SCR 1, turning SCR 1, SCR 2, and SCR 4 off. C2 continues to discharge through D3 until it reaches the alternator voltage, at which point current reverses through SCR 7. At this point, all of the SCR's are turned off and the current through L1 begins to change at a rate sufficient to bring the voltage across L1 up to the alternator voltage. Then, diodes D1 and D2 begin to conduct and L1 discharges the remainder of its energy to the alternator and C1, thereby completing the half cycle of operation.

Consequently, the average current drawn from the alternator is the current drawn until SCR 7 fires minus the current returned by the inductor L1. Additionally, L1 insures that the alternator voltage need not match the ac line voltage at any time. Finally, the delay in firing SCR 7 after SCR 1 determines the amount of power delivered to the ac line and is completely controllable by the stall control circuitry illustrated in FIGS. 8 and 9.

Figure 18:
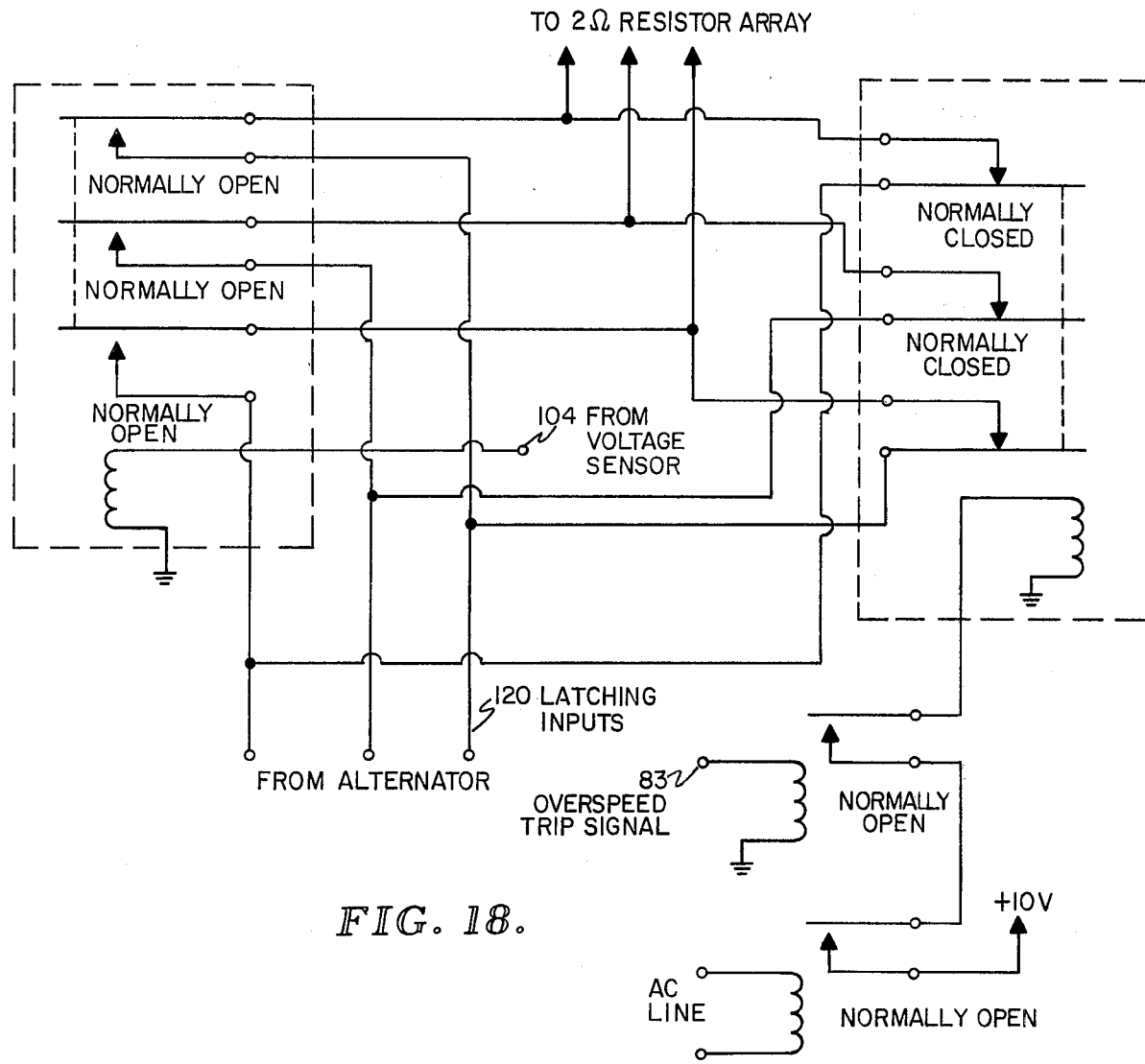
FIG. 18 is a schematic diagram of the relay assembly of the device of the present invention.
Figure 19:
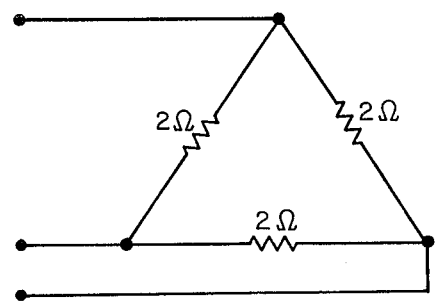
FIG. 19 is a schematic diagram of the resistive network which is coupled to the relay assembly illustrated in FIG. 18.

FIG. 18 discloses the relay assembly 100 disclosed in FIG. 8. The relay assembly 100 provides a fail safe mechanism which connects the 2 ohm resistor array illustrated in FIG. 19 across the armature of the permanent magnet alternator when certain conditions exist. For example, failure of the ac line or indication of a voltage produced by the alternator which exceeds a predetermined maximum from either the overspeed trip signal 83, output 104 from the voltage sensor, or the latching input signals 120 will cause the relays disclosed in FIG. 18 to activate and connect the 2 ohm resistor array directly across the armature of the alternator. Connection of the 2 ohm resistor array across the armature will provide sufficient load to decrease the rotational speed of the wind turbine sufficiently to induce aerodynamic stall and cause the wind turbine to stop rotating in any wind conditions.

Consequently, the present invention provides a fixed-pitch wind turbine device which is extremely reliable and is capable of extracting wind energy for direct conversion to electrical power for storage in an ac utility grid in a highly efficient manner utilizing aerodynamic principles of operation. The wind turbine system of the present invention is capable of extracting essentially optimum output power for a wide range of wind speeds utilizing a fixed-pitch wind turbine and, additionally, protecting the fixed-pitch wind turbine from high-rotational-speed-induced failure in a highly reliable manner. Moreover, the unique impedance matching network, inverter, and the associated control circuitry couples power to the ac grid without generating voltage and current spikes in a highly efficient manner with little loss. The mechanical simplicity of the wind turbine system disclosed in accordance with the present invention also allows the device to be produced with relatively low capital investment and assures proper and reliable operation for many years of use.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the present invention could be implemented using analog circuitry to achieve the same results as disclosed herein. Also, relay assembly 100 of FIG. 8 could be connected directly to the rotating portion of the wind turbine which points with the wind to add an additional margin of safety for stalling the device of the present invention in high wind speeds. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fixed-pitch wind turbine system comprising:
   a fixed-pitch wind turbine;
   an alternator coupled to said fixed-pitch wind turbine, said alternator having an armature which produces an output voltage substantially proportional to the speed of rotation of said fixed-pitch wind turbine;
   means for regulating said output voltage of said armature to control said speed of rotation of said fixed-pitch wind turbine to optimize power delivered by said alternator and induce aerodynamic stall in said fixed-pitch wind turbine whenever said optimized output power exceeds a predetermined maximum.

2. The system of claim 1 wherein said alternator includes:
   a permanent magnet rotor; and,
   a stator armature having a directly coupled output with no moving electrical contacts.

3. The system of claim 1 wherein said means for regulating said output voltage includes means for intermittently coupling said stator armature to a low impedance utility grid load.

4. The system of claim 3 further comprising means for connecting a secondary low impedance load across said armature of said alternator means whenever said utility grid fails to provide a low impedance load.

5. The system of claim 3 further comprising means for connecting a secondary low impedance load across said armature of said alternator means whenever said armature output voltage reaches a predetermined maximum.

6. The system of claim 1 further comprising transformer means for coupling said output voltage produced by said armature to said means for regulating, said transformer means having primary and secondary circuits which are free to rotate with regard to each other according to wind direction.

7. The system of claim 3 wherein said means for regulating said output voltage includes:
   a forced commutation synchronous inverter coupled to said low impedance utility grid load;
   inductive impedance matching circuit means coupled between said stator armature and said low impedance utility grid load for storing and returning current not delivered to said utility grid means to said stator armature;

control circuit means for producing phase switching signals to control said forced commutation synchronous inverter to connect said output voltage of said stator armature to said low impedance utility grid load for a predetermined phase interval which is dependent upon said output voltage to thereby reduce said output voltage by a factor sufficient to cause said fixed-pitch wind turbine to achieve a rotational speed which substantially optimizes output power from said alternator for rotational speeds of said wind turbine below a predetermined maximum rotational speed such that aerodynamic stall is induced in said wind turbine by limiting said output voltage to a predetermined maximum voltage which corresponds to said predetermined maximum rotational speed of said wind turbine.

8. A fixed-pitch wind turbine system for economically converting available wind power to electrical power to be stored in an ac utility grid comprising:

a fixed-pitch wind turbine;

alternator means for producing electrical power in response to rotation of said alternator by said wind turbine;

control circuit means for transmitting a predetermined amount of said electrical power produced by said alternator means to said ac utility grid means to match said available wind power and thereby transmit a substantially optimum amount of power to said ac utility grid for said available wind power and to induce aerodynamic stall in said wind turbine by increasing said predetermined amount of power transmitted to said ac utility grid beyond said substantially optimum amount of power whenever said electrical power produced by said alternator means exceeds a predetermined maximum.

9. A fixed-pitch wind turbine system comprising:

a fixed-pitch wind turbine;

alternator means having a permanent magnet rotor coupled to said wind turbine and a stator armature which produces a rectified voltage output substantially proportional to the speed of rotation of said permanent magnet rotor;

utility grid means for providing a low impedance load;

means for intermittently coupling said rectified voltage output from said armature to said utility grid means for a predetermined switching interval to control the average output voltage of said armature and thereby control said speed of rotation of said permanent magnet rotor to obtain a substantially optimum angle of attack of said fixed-pitch wind turbine to relative wind velocity to substantially optimize output power from said alternator means for actual wind speeds below a predetermined maximum speed above which aerodynamic stall is induced in said wind turbine by controlling the rotation speed of said rotor to increase the angle of attach of said wind turbine with said relative wind to an angle greater than said optimum angle of attack and thereby protect said wind turbine from overspeeding.

10. The system of claim 9 further comprising means for connecting a secondary low impedance load across said armature of said alternator means to induce aerodynamic stall whenever said rectified voltage output reaches a predetermined maximum.

11. The system of claim 9 wherein said means for intermittently coupling said rectified voltage output from said armature to said utility grid means comprises:

means for transmitting power synchronously to said utility grid means during said predetermined switching interval;

means for controlling said predetermined switching interval in accordance with the magnitude of said rectified voltage output.

12. The system of claim 11 wherein said means for transmitting power comprises:

an inductive network impedance matching circuit;

a forced commutation synchronous inverter connected to said inductive network impedance matching circuit.

13. A fixed-pitch wind turbine system comprising:

a fixed-pitch wind turbine;

an alternator coupled to said fixed-pitch wind turbine, said alternator having a permanent magnet rotor and a stator armature;

rectifier filter means connected to said stator armature for producing a dc signal having a voltage magnitude which is proportional to the rotational speed of said wind turbine;

low impedance utility grid means for providing a low impedance load;

a forced commutation synchronous inverter coupled to said low impedance utility grid means;

inductive impedance matching circuit means coupled between said rectifier filter means and said low impedance utility grid means for storing and returning current to said rectifier filter means which is not delivered to said low impedance utility grid means;

control circuit means for producing phased switching signals to control said forced commutation synchronous inverter to connect said dc signal to said low impedance utility grid means for a predetermined phase interval which is dependent upon said voltage magnitude of said dc signal to thereby reduce said voltage magnitude by a factor sufficient to cause said fixed-pitch wind turbine to achieve a rotational speed which substantially optimizes output power from said alternator for rotational speeds of said wind turbine below a predetermined maximum rotational speed, such that aerodynamic stall is induced in said wind turbine by limiting said voltage magnitude of said dc signal to a predetermined maximum voltage which corresponds to said predetermined maximum rotational speed of said wind turbine.

14. The system of claim 13 further comprising means for coupling a secondary low impedance load across said stator armature to induce aerodynamic stall whenever a power failure exists in said low impedance utility grid means.

15. The system of claim 13 further comprising means for coupling a secondary low impedance load across said stator armature to induce aerodynamic stall whenever said voltage magnitude reaches a predetermined maximum.

16. The system of claim 13 further comprising transformer means for coupling electrical power produced by said alternator to said control circuit means.

* * * * *